United States Patent [19]

Niwa et al.

[11] Patent Number: 4,587,070

[45] Date of Patent: May 6, 1986

[54] METHOD FOR MANUFACTURE OF WATERPROOF FIBROUS PLATE

[75] Inventors: Hajime Niwa; Katsumi Hironaka, both of Hiroshima, Japan

[73] Assignee: AOI Chemical, Inc., Hiroshima, Japan

[21] Appl. No.: 594,759

[22] Filed: Mar. 29, 1984

[30] Foreign Application Priority Data

Oct. 28, 1983 [JP] Japan ................. 58-201954

[51] Int. Cl.$^4$ ............................................. B29C 67/02
[52] U.S. Cl. ..................... 264/122; 162/171; 264/125; 264/129; 264/DIG. 32
[58] Field of Search ............... 264/122, 136, 125, 257, 264/330, 129, DIG. 32; 428/489; 162/171

[56] References Cited

U.S. PATENT DOCUMENTS

| | | | |
|---|---|---|---|
| 1,438,966 | 12/1922 | Perry | 264/DIG. 32 |
| 1,498,401 | 6/1924 | Perry | 264/DIG. 32 |
| 3,271,240 | 9/1966 | Kari et al. | 162/171 |
| 3,668,064 | 6/1972 | Kucera | 162/171 |

FOREIGN PATENT DOCUMENTS 563238  9/1958  Canada ......................... 162/171

*Primary Examiner*—Donald Czaja
*Assistant Examiner*—Mary Lynn Fertig
*Attorney, Agent, or Firm*—Quaintance, Murphy & Presta

[57] ABSTRACT

This invention provides a method for the manufacture of a fibrous plate rich in water resistance, which comprises the steps of uniformly mixing and dispersing fibrous raw material and finely divided bituminous substance in water, molding the resultant aqueous dispersion in the shape of a plate, and heating the plate with a hot press thereby melting the bituminous substance contained in the fibrous material and converting the plate into a fibrous plate having the bituminous substance uniformly dispersed therein. The fibrous plate obtained by this method excels in water resistance, weatherability, and thermal insulation and passes the standard specification concerning joint plates for use in concrete structures.

16 Claims, No Drawings

METHOD FOR MANUFACTURE OF WATERPROOF FIBROUS PLATE

BACKGROUND OF THE INVENTION

1. Field of the Invention

This invention relates to a method for the manufacture of waterproof fibrous plates usable as an expansible sealant plate for concrete joints and as floorings for buildings, core materials for tatami mats, substrates for walls, and insulating liners for roofings as well.

2. Description of the Prior Art

Generally various joints are formed in wide concrete pavements for roads, airfields, factories, and cargo yards and in concrete structures such as buildings, dams and embankments. Since such joints are expected to repel foreign matter and retain flatness of surface and, at the same time, prevent rainwater from seeping into roadbeds, adoption of injected joint materials and molded joint plates has prevailed to date. The molded joint plates so used include bituminous molded joint plates (widely known as "elastite") which are produced by kneading a bituminous substance represented by petroleum asphalt with a filler under application of heat, molding the resultant mixture in the shape of plates, and covering the opposite surfaces of such plates with asphalt paper, bituminous fibrous joint plates which are produced by impregnating fibrous plates as with thermally melted petroleum asphalt or cutback asphalt prepared by dissolving and dispersing petroleum asphalt in a petrolic solvent, and foamed joint plates which are produced by foaming resin or rubber. Most of these conventional joint plates have fine properties and poor properties at the same time. Although the bituminous joint plates are economical from the viewpoint of cost, they have a disadvantage in that they conspicuously protrude from concrete pavements owing to expansion or shrinkage of concrete slabs, suffer from heavy changes in properties due to changes of weather conditions, and exhibit very poor resiliency. The foamed joint plates made of synthetic resin enjoy high resiliency and refrain from notably protruding from concrete pavements. They nevertheless have a disadvantage in that they exhibit insufficient rigidity and consequently inferior workability, possess low compressive strength, and therefore fail to keep their original thickness intact under pressure from concrete slabs.

The bituminous fibrous joint plates produced by the impregnation of fibrous plates with thermally melted asphalt, a method heretofore generally accepted are improved in part over the bituminous joint plates. Owing to the impregnation with the asphalt, they inevitably have high asphalt content and great weight. In terms of resiliency, protrusiveness, etc., they are more or less inferior to the resin-containing foamed joint plates.

The bituminous fibrous joint plates produced by another method, i.e. the impregnation of fibrous plates with cutback asphalt prepared by kneading asphalt with a petroleum solvent have the possibility fo catching fire during their actual use in concrete pavements and concrete structures and prove costly because of the high price of petroleum raw materials. owing to insufficient content of bituminous component and excessive capacity for water absorption, they do not pass the specification of ASTM D-1751-73.

As described above, the existing waterproof fibrous plates are now extensively used as sealant plates for concrete joints and as floorings in buildings, core materials for tatami mats, substrates for walls, and insulating lines for roofings as well. To satisfy such extensive applications, the waterproof fibrous plates must excel in waterproofness, insulating property, corrosionproofness, and weatherability, possess resiliency, be light weight and permit easy handling.

SUMMARY OF THE INVENTION

An object of this invention is to provide a method for the manufacture of a waterproof fibrous plate which excels in waterproofness, weatherability, and insulating property and satisfies the standard specification for joint plates in concrete structures.

After a diligent study, the inventors have found that a waterproof fibrous plate excelling in the aforementioned properties is obtained by mixing and dispersing a raw material for fibrous plate and finely divided bituminous substance in water, molding the resultant aqueous dispersion in the shape of a plate, and heating the resultant plate to fuse the bituminous substance dispersed therein. The present invention has issued from this knowledge.

To be more specific, in accordance with the present invention, there is provided a method for the manufacture of a fibrous plate rich in waterproofness, which comprises the steps of uniformly mixing and dispersing fibrous raw material and finely divided bituminous substance in water, molding the resultant aqueous dispersion in the shape of a plate, and heating the plate with a hot press, thereby melting the bituminous substance contained in the fibrous material and converting the plate into a fibrous plate having the bituminous substance uniformly dispersed therein.

DETAILED DESCRIPTION OF THE INVENTION

As previously noted, the present invention involves a novel method for the manufacture of a waterproof fibrous plate. It has been found that a waterproof fibrous plate excelling in waterproofness, weatherability and insulating property can be obtained by uniformly mixing and dispersing fibrous raw material and finely divided bituminous substance in water, molding the resultant aqueous dispersion in the shape of a plate, and heating the plate with a hot press.

A waterproof fibrous plate having the desired properties can be obtained by the method mentioned above. Further it will be appreciated that in accordance with the present invention, the aqueous dispersion of fibrous raw material and finely divided bituminous substance may have a cationic asphalt emulsion added thereto and uniformly mixed and dispersed therein.

Furthermore, to enhance the water-repelling property of the ultimate fibrous plate, a dilute solution having an anionic asphalt emulsion dispersed in water, preferably a mixed solution consisting of an anionic asphalt emulsion and an anionic or nonionic synthetic resin emulsion stably mixable therewith, may be uniformly applied to the surface of the fibrous plate obtained after the step of molding the aqueous dispersion in the shape of a plate, by spraying. Subsequently, the solution deposited on the fibrous plate may be dried by hot-pressing the wet fibrous plate. The layer of asphalt or the layer of asphalt and synthetic resin thus formed on the surface of the fibrous plate vests the fibrous plate with an outstanding water-repelling property.

The method of this invention for the manufacture of the waterproof fibrous plate can be worked with an ordinary fibrous plate molding device and a hot-press drying device.

As the fibrous raw material, one or more ordinary raw materials selected from the group consisting of vegetable fibers (cane fiber, ligneous fiber, bast fiber, and cotton staple), used paper pulp, and chemical pulp can be used. For example, a fibrous plate of high strength is obtained by using a mixture of 45% by weight of vegetable fiber and ligneous powder, 10% by weight of cotton staple, and 45% by weight of used paper pulp and chemical pulp.

Desirably, a selected fibrous raw material or materials opened in advance are dispersed in a large volume of water, generally water of the grade used for paper making, and a bituminous substance crushed into finely divided particles is uniformly mixed with the resultant aqueous dispersion, optionally in conjunction with a cationic asphalt emulsion. The expression "water of the grade for paper making" as used herein means water which may contain additives customarily used in paper making.

Examples of the bituminous substance to be mixed with the fibrous raw material include natural and petrolic asphalts, petroleum pitch, coal tar pitch, mixtures thereof, and other similar solid materials which have softening points not exceeding 140° C. For example, any asphalt which is reducible in size to about 5-50 mesh, preferably 5 to 20 mesh and which, like an ordinary blown petroleum asphalt or natural asphalt, has a relatively low penetration number, on the order of about 0 to 20 at 25° C., proves suitable. Any pitch such as coal tar pitch, wood tar pitch, or rosin pitch which has a softening point not exceeding 140° C. can be used.

The particle size of the bituminous substance preferably falls substantially in the range of about 5 to 50 mesh, preferably about 5 to 20 mesh. The reduction in size of the bituminous substance to this particle size may be accomplished by crushing the substance with a rotary blade operated at a high speed under cooled water. The bituminous substance consequently dispersed in the water may be used in its unaltered form.

The amount of the bituminous substance to be included in the fibrous plate is not specifically defined. It may be selected to suit the specified quality of the waterproof fibrous plate desired to be produced. Generally, this amount is in the range of about 25 to 100% by weight based on the amount of the fibrous raw material. Particularly where the cationic asphalt emulsion is excluded from the formulation, the amount of the bituminous substance is desired to be not less than about 65% by weight, preferably in the range of about 70 to 90% by weight, based on the amount of the fibrous raw material. Where the cationic asphalt emulsion is included in the formulation, use of the bituminous substance in an amount between about 50% and about 90% by weight, preferably between 65% and 90% by weight, based on the amount of the fibrous raw material, proves particularly advantageous.

When the amount of the bituminous substance included in the formulation is large, all the fibers in the fibrous plate can be coated uniformly with the bituminous component by heating the fibrous plate with a hot press, thereby melting the bituminous component dispersed therein. In contrast, when the amount of the bituminous substance included in the formulation is small, the bituminous component may be unevenly distributed within the fibrous plate so that some portions of the interior of the fibrous plate will be coated with the bituminous component and other portions will escape being so coated. Such an awkward situation may be avoided by additionally incorporating a cationic asphalt emulsion in the formulation and subsequently drying the wet molded fibrous plate by application of heat. Consequently, all the fibers in the fibrous plate will be thoroughly coated with the bituminous component.

As the cationic asphalt emulsion, any commercially available cationic asphalt emulsion produced by emulsifying an asphalt having a penetration number of 60 to 300 at 25° C. with a cationic surface active agent can be used. Generally, the asphalt solids content of the emulsion is in the range of 50 to 60%. For example, any of the commercially available cationic asphalt emulsions equivalent to the grades PK-1 (Impregnation grade No. 1) through PK-3 (Impregnation grade No. 3) as designated in accordance with JIS (Japanese Industrial Standard) can be used.

The amount of the cationic asphalt emulsion to be included in the formulation may be varied suitably within the range of about 10 to 60% by weight, preferably about 20 to 35% by weight, based on the amount of the fibrous raw material. When the amount is less than 10% by weight, the effective coating of the fibers with the bituminous substance may not be obtained with ease. When this amount exceeds 60% by weight, the conversion of the aqueous dispersion into the fibrous plate cannot be effected with ease.

The asphalt particles suspended in the aforementioned cationic asphalt emulsion are thoroughly deposited on the surface of the fibrous raw material due to the property of the asphalt emulsion that it is readily decomposed and can be readily deposited on a given substrate and to the condition that the asphalt emulsion is diluted with a large volume of the water having a weakly basic fibrous raw material dispersed therein. Further, during the course of the molding of the aqueous dispersion accompanied by removal of water, the water of the grade of paper making is destined to be filtered through the fibrous raw material. Consequently, the asphalt particles are able to assume a state in which they are minimally released into the water removed from the aqueous dispersion. In the conventional treatment of this nature, it has been inevitable to use a sizing agent and a coagulating agent. The method of this invention finds no use for such agents.

The bituminous substance in such an emulsion as described above excels in weatherability, water-repelling property, and corrosion resistance. When it is mixed with the fibrous raw material, it can impart such outstanding properties to the produced fibrous plate and can serve as a binder for the individual fibers of the fibrous plate.

Next, the anionic asphalt emulsion to be used for application to the surface of the molded fibrous plate by spraying exhibits higher stability than the cationic emulsion, retains this stability even when it is diluted with water, and avoids inducing adhesion of asphalt particles to the wall of a path used for spraying or cohesion of adjacent asphalt particles As the emulsion to be used in this invention, any commercially available anionic natural or petrolic asphalt emulsions may be adopted. Examples are asphalt emulsions equivalent to the grades MA-1 (Blending grade No. 1)-MA-S (Blending grade No. 3) as designated in accordance with JIS.

Examples of the anionic or nonionic synthetic resin emulsion to be used as mixed with the anionic asphalt emulsion include the emulsions of vinyl acetate resin, EVA-acrylic resin, the resin of a multicomponent polymer of the monomers making up such resins, acrylic ester resins, styrene-acryl copolymer resin, and paraffins. From the group of these resin emulsions, at least one emulsion which exhibits desirable properties including stable mixability with the anionic asphalt emulsion to be used for application by spraying must be selected. Commercially available "Polysol P-400" (trademark designation; manufactured by Showa Koubunshi Co., Ltd.) and "Mobinyl #861" (trademark designation; manufactured by Hoechst Gosei Co., Ltd.) are good examples.

The mixing ratio by volume of the anionic asphalt emulsion to the synthetic resin emulsion falls in the range of about 10:1 to 4:1, preferably 6:1 to 5:1. The amount of the resultant mixture to be applied by spraying generally falls in the range of 0.2 to 1.5 kg/m$^2$, preferably 0.5 to 1.0 kg/m$^2$.

By applying the mixture by spraying, a layer of asphalt or layer of asphalt and synthetic resin can be formed on the surface of the fibrous plate. The fibrous plate thus completed, therefore, enjoys outstanding water-repelling property.

The plate having the mixed solution of asphalt emulsion applied uniformly by spraying to the opposite surfaces thereof is forwarded to the next step of drying, where it is dried with hot blast generally at temperatures of about 100° to 120° C. Alternatively, the plate is dried in natural draft.

Subsequently, the dry plate is treated with an ordinary hot-press device generally at temperatures of about 140° to 160° C. Consequently, the asphalt or pitch particles uniformly distributed throughout the plate are melted by the heat from the hot-press.

The temperature and duration of the treatment with this hot-press device are suitably decided depending on the softening point of the bituminous substance to be used and the water content of the half-finished plate before the step of the hot-press treatment. Generally, the temperature is in the range of about 140° to 160° C. and the duration is in the range of 20 to 50 minutes.

Now, the present invention will be described in more detail below with reference to working examples.

EXAMPLE 1

Under cooled water, 320 kg of a fibrous raw material consisting of the components shown in Table 1 below and 240 kg of a commercially available petroleum asphalt—blown asphalt of a specified penetration number 10–20 (solid having a softening point of about 98° C. and a penetration number of about 16)—were crushed to a particle size of 5 to 20 mesh. The resultant aqueous suspension was dispersed uniformly in about 2000 liters of water at room temperature.

The resultant material was dehydrated by squeezing and molded in the shape of a plate about 15 mm in thickness by the use of a wet sheet making machine. The resultant wet plate was dried at 100° to 120° C. and then compressed with a hot press at 140° C. to 150° C. for 20 minutes, to produce a fibrous plate measuring 10 mm in thickness and about 110 m$^2$ in area.

TABLE 1

| Formulation of fibrous raw material | |
|---|---|
| Name of component | Amount (% by weight) |
| Vegetable fibers and ligneous powder | 45 |
| Cotton staple | 10 |
| Used paper pulp and chemical pulp | 45 |

EXAMPLE 2

Under cooled water, 320 kg of a fibrous raw material consisting of the components shown in Table 1 and 240 kg of the same petroleum blown asphalt as used in Example 1 were crushed to a particle size of 5 to 20 mesh. The resultant aqueous suspension was uniformly dispersed in about 2000 liters of water at room temperature. The resultant material was thoroughly mixed with 100 kg of a cationic impregnation grade asphalt emulsion (produced by TOUA DOURO CO., LTD. and marketed under trademark designation of PK-3) added thereto.

Then, the mixture thus produced was dehydrated by squeezing and molded in the shape of a plate about 15 mm in thickness by the use of a wet sheet making machine. The wet plate was then dried at 100° to 120° C. and further compressed with a hot-press at 140° to 150° C. for 20 minutes, to produce a fibrous plate measuring 10 mm in thickness and about 112 m$^2$ in area.

EXAMPLE 3

A mixture formed of the same components as used in Example 2 was dehydrated by squeezing and molded in the shape of a plate about 15 mm in thickness by the use of a wet sheet making machine. Then, a mixed solution consisting of 60% of an anionic blending grade asphalt emulsion (produced by TOUA DOURO CO., LTD. and marketed under trademark designation of DMA), 10% of ethylene-vinyl acetate-acryl multicomponent polymer resin emulsion (produced by SHOWA KOBUNSHI CO., LTD. and marketed under trademark designation of POLIYSOL P-400), and 30% of water was applied by spraying to the entire surface of the aforementioned plate on a production line to deposit 0.75 kg of the mixed solution per m$^2$ of the surface. Thereafter, the wet plate was dried with hot blast at 100° to 120° C. and further compressed in a hot-press at 140° to 150° C. for 20 minutes, to afford a fibrous plate measuring 10 mm in thickness and about 112 m$^2$ in area.

In the fibrous plate obtained in this example, the fibers were uniformly coated and bound fast with the bituminous component. The fibrous plate exhibited relatively high resiliency, was light-weight, and abounded in water resistance.

The fibrous plates which were obtained in the working examples cited above in accordance with this invention were tested for physical properties as specified by ASTM D-1751-73 (U.S.A.) regarding joint plates for use in concrete structures. The results are shown in Table 2.

TABLE 2

| | Results of test according to ASTM D-1751-73 | | | |
|---|---|---|---|---|
| Item | Example 1 | Example 2 | Example 3 | Specification of ASTM |
| Resistance to impacts during handling | admissable | admissible | admissible | No deformation or rupture admissable. |
| ½ Compressive strength (kg/cm$^2$) | 55.3 | 56.3 | 56.8 | 7.03–87.9 |

TABLE 2-continued

| Item | Results of test according to ASTM D-1751-73 | | | Specification of ASTM |
| --- | --- | --- | --- | --- |
| | Example 1 | Example 2 | Example 3 | |
| Recovery ratio (%) | 81.0 | 81.9 | 81.6 | 70 at min. |
| Protrusion (mm) | 0.7 | 0.7 | 0.8 | 6.4 at max. |
| Density (g/cm³) | 0.496 | 0.505 | 0.512 | 0.304 at min. |
| Bituminous component content (%) | 37.1 | 39.2 | 40.8 | 35 at min. |
| Water absorption (%) | 11.8 | 10.3 | 8.2 | 20 at max. |
| After weather test: | | | | |
| ¼ compressive strength (kg/cm²) | 54.8 | 55.3 | 56.1 | 7.03–87.9 |
| Recovery ratio (%) | 79.2 | 79.9 | 79.5 | 70 at min. |
| Protrusion (mm) | 0.7 | 0.7 | 0.7 | 6.4 at max. |

It is noted from the results of Table 2 that the fibrous plates produced as described in Examples 1, 2, and 3 passed all the test items specified by ASTM D-1751-73 with respect to joint plates for use in concrete structures. This fact indicates that since the method contemplated by this invention for the manufacture of a waterproof fibrous plate permits free adjustment of the bituminous component content in the formulation, it is capable of imparting to the produced fibrous plate outstanding properties such as high recovery ratio, absence of protrusion, proper compressive strength, and high water resistance.

Further, the products obtained in the working examples equally excelled in water resistance. Particularly, by the procedure of Example 3, there was obtained a fibrous plate which showed a high water-repelling property and, when subjected to the aforementioned test for water absorption involving complete immersion of the sample under water, exhibited a minimal capacity for water absorption sufficient to pass the value specified by ASTM.

The fibrous plate was also excellent in weatherability. After the weather test exposing the sample to 10 cycles of freezing and defreezing under water, the fibrous plate showed properties substantially unchanged from its original properties.

The heat transfer coefficients exhibited by the fibrous plates produced in the working examples fell in the range of 0.12 to $0.14 \times 10^{-3}$ (cal.cm$^{-1}$.sec$^{-1}$.deg$^{-1}$). Since they incorporated air in their interior voids, they also exhibited properties which thermal insulators are required to possess.

As described above, this invention provides a waterproof fibrous plate in which a bituminous substance is uniformly distributed in a fibrous raw material and which, therefore, excels in water resistance, weatherability, and thermal insulation.

Further, in accordance with this invention, there can be produced a joint plate for concrete structures which satisfies all the requirements specified by the standard (ASTM D-175-73) concerning fibrous joint plates made of bituminous substance.

Moreover, the fibrous plate according to the present invention possesses high compressive strength and resiliency in conjunction with water resistance and weatherability, is light-weight, and exhibits high thermal insulation. Thus, it is unable as substrates for waterproofing layers, protective materials for waterproofing layers, substrates for walls, floorings for buildings, and insulating liners for roofings, in addition to being suitable for use as joint plates in concrete structures.

What is claimed is:

1. A method for manufacturing a waterproof sealant plate for concrete joints, which comprises the steps of uniformly mixing and dispersing fibrous raw material and a finely divided bituminous substance in water to produce an aqueous dispersion, adding a cationic asphalt emulsion to the aqueous dispersion, molding the aqueous dispersion into a plate, uniformly applying a mixed solution consisting of an anionic asphalt emulsion and an anionic or nonionic synthetic resin emulsion to the surface of the plate by spraying, and heating the plate with a hot press thereby melting the bituminous substance contained in the fibrous material and converting the plate into a waterproof sealant plate having the bituminous substance uniformly dispersed therein.

2. A method according to claim 1, wherein said finely divided bituminous substance is mixed and dispersed in the aqueous dispersion of said fibrous raw material prepared in advance.

3. A method according to claim 1, wherein said finely divided bituminous substance and a cationic asphalt emulsion are mixed and dispersed in the aqueous dispersion of said fibrous raw material prepared in advance.

4. A method according to claim 1, wherein said finely divided bituminous substance has a particle size substantially within a range of about 5 to 20 mesh.

5. A method according to claim 1, wherein the amount of said bituminous substance falls in a range of about 25 to 100% by weight based on the amount of said fibrous raw material.

6. A method according to claim 1, wherein the amount of said bituminous substance falls in the range of about 50 to 90% by weight based on the amount of said fibrous raw material.

7. A method according to claim 1, wherein the amount of said cationic asphalt emulsion falls in the range of about 10 to 60% by weight based on the amount of said fibrous raw material.

8. A method for manufacturing a waterproof sealant plate for concrete joints, comprising the steps of:
   I. uniformly mixing and dispersing fibrous raw material and finely divided bituminous substance in water to produce an aqueous dispersion, said fibrous raw material comprising at least one member selected from the group consisting of vegetable fibers, cane fiber, ligneous fiber, bast fiber, cotton staple, used paper pulp and chemical pulp; wherein said bituminous substance comprises at least one member selected from the group consisting of natural asphalt, petrolic asphalt, petroleum pitch and coal tar pitch; and then
   II. adding a cationic asphalt emulsion to the aqueous dispersion; and then
   III. molding the aqueous dispertion into a plate; and then
   IV. heating the plate with a hot press, thereby melting the bituminous substance and converting the plate into a waterproof sealant plate having the bituminous substance uniformly dispersed therein.

9. A method for manufacturing a waterproof fibrous plate comprising the steps of:
  I. preparing an aqueous dispersion by uniformly mixing and dispersing fibrous raw material and a finely divided bituminous substance in water; and then
  II. adding a cationic asphalt emulsion to the aqueous dispersion, uniformly mixing and dispersing said cationic asphalt emulsion in said aqueous dispersion; and then
  III. molding said aqueous dispersion into a plate; and then
  IV. spraying said plate with an anionic asphalt emulsion; and then
  V. heating the plate with a hot press, thereby melting the bituminous substance and converting the plate into a waterproof fibrous plate having the bituminous substance uniformly dispersed therein.

10. A method of claim 9 wherein said bituminous substance has a softening point no higher than 140° C., a penetration number of about 0 to 20 at 25° C. and a particle size of 5 to 20 mesh.

11. A method of claim 9 wherein said cationic asphalt emulsion is produced by emulsifying an asphalt having a penetration number of 60 to 300 at 25° C. with a cationic surface active agent, said cationic asphalt emulsion having an asphalt solids content of 50% to 60% by weight based on the weight of cationic asphalt emulsion.

12. A method for manufacturing a waterproof fibrous plate comprising the steps of:
  I. preparing an aqueous dispersion by uniformly mixing and dispersing fibrous raw material and a finely divided bituminous substance in water; and then
  II. adding a cationic asphalt emulsion to the aqueous dispersion; and then
  III. molding said aqueous dispersion into a plate; and then
  IV. heating the plate with a hot press to produce a fibrous plate having the bituminous substance uniformly dispersed therein;
  wherein the weight of the bituminous substance is 50% to 90%, by weight, based on the weight of the fibrous raw material; and
  wherein the weight of cationic asphalt emulsion is 20% to 35%, by weight, based on the weight of the fibrous raw material.

13. A method for manufacturing a waterproof fibrous plate comprising the steps of:
  I. preparing an aqueous suspension by crushing, under cooled water, 320 kg of a fibrous raw material and 240 kg of petroleum asphalt to a particle size of 5 to 20 mesh, said fibrous raw material consisting of: 45% by weight vegetable fiber and ligneous powder, 10% by weight cotton staple and 45% by weight used paper pulp and chemical pulp, and said petroleum asphalt having a penetration number of 10 to 20 and a softening point of about 98° C.; and then
  II. dispersing the aqueous suspension uniformly in about 2000 liters of water to produce an aqueous dispersion; and then
  III. dehydrating said aqueous dispersion by squeezing; and then
  IV. molding said aqueous dispersion into a plate using a wet sheet making machine; and then
  V. drying said plate at 100° to 120° C.; and then
  VI. compressing said plate with a hot press at 140° C. to 150° C. for 20 minutes to produce a waterproof fibrous plate having a thickness of 10 mm and an area of about 110 m².

14. A method for manufacturing a waterproof fibrous plate comprising the steps of:
  I. preparing an aqueous suspension by crushing, under cooled water, 320 kg of a fibrous raw material and 240 kg of petroleum asphalt to a particle size of 5 to 20 mesh, said fibrous raw material consisting of: 45% by weight vegetable fiber and ligneous powder, 10% by weight cotton staple and 45% by weight used paper pulp and chemical pulp, and said petroleum asphalt having a penetration number of 10 to 20 and a softening point of about 98° C.; and then
  II. dispersing the aqueous suspension uniformly in about 2000 liters of water to produce an aqueous dispersion; and then
  III. admixing 100 kg of a cationic asphalt emulsion with the aqueous dispersion; and then
  IV. dehydrating said aqueous dispersion by squeezing; and then
  V. molding said aqueous dispersion into a plate using a wet sheet making machine; and then
  VI. drying said plate at 100° to 120° C.; and then
  VII. compressing said plate with a hot press at 140° C. to 150° C. for 20 minutes to produce a waterproof fibrous plate having a thickness of 10 mm and and area about 110 m².

15. A method for manufacturing a waterproof fibrous plate comprising the steps of:
  I. preparing an aqueous suspension by crushing, under cooled water, 320 kg of a fibrous raw material and 240 kg of petroleum asphalt to a particle size of 5 to 20 mesh, said fibrous raw material consisting of 45% by weight vegetable fibers and ligneous powder, 10% by weight cotton staple and 45% by weight used paper pulp and chemical pulp, and said petroleum asphalt having a penetration number of 10 to 20 and a softening point of about 98° C.; and then
  II. dispersing the aqueous suspension uniformly in about 2000 liters of water to produce an aqueous dispersion; and then
  III. mixing 100 kg of a cationic asphalt emulsion into the aqueous dispersion; and then
  IV. dehydrating said aqueous dispersion by squeezing; and then
  V. molding said aqueous dispersion into a plate using a wet sheet making machine; and then
  VI. spraying said plate with a mixed solution comprising 60% of an anionic asphalt emulsion, 10% of ethylene-vinyl acetate-acryl multi-component polymer resin emulsion and 30% of water, to produce a wet plate; and then
  VII. drying said wet plate with hot blast at 100° to 120° C.; and then
  VIII. compressing said wet plate in a hot press at 140° C. to 150° C. for 20 minutes to produce a waterproof fibrous plate having a thickness of 10 mm and an area of 112 m².

16. A method for manufacturing a waterproof fibrous plate which comprises the steps of:
  I. uniformly mixing and dispersing fibrous raw material and a finely divided bituminous substance in water to produce an aqueous dispersion; and then
  II. adding a cationic asphalt emulsion to the aqueous dispersion; and then III. molding the aqueous dispersion into a plate; and then IV. spraying the plate with a mixed solution consisting of an anionic asphalt emulsion and an anionic or nonionic synthetic resin emulsion; and then V. heating the plate with a hot press thereby melting the bituminous subtance contained in the fibrous material and converting the plate into a waterproof fibrous plate having the bituminous substance uniformly dispersed therein;

wherein the weight of the bituminous substance is 65% to 90%, by weight, based on the weight of the fibrous material; and wherein the particle size of the bituminous substance is from 5 to 20 mesh; and wherein the weight of cationic asphalt emulsion is 20% to 35%, by weight, based on the weight of the fibrous raw material; and wherein the cationic asphalt emulsion has an asphalt solids content of 50% to 60%; and wherein the ratio by volume of the anionic asphalt emulsion to the synthetic resin emulsion in the mixed solution is from 6:1 to 5:1; and wherein the amount of mixed solution sprayed onto the plate is from 0.5 to 1.0 kg/m$^2$.

* * * * *